Figure 1:
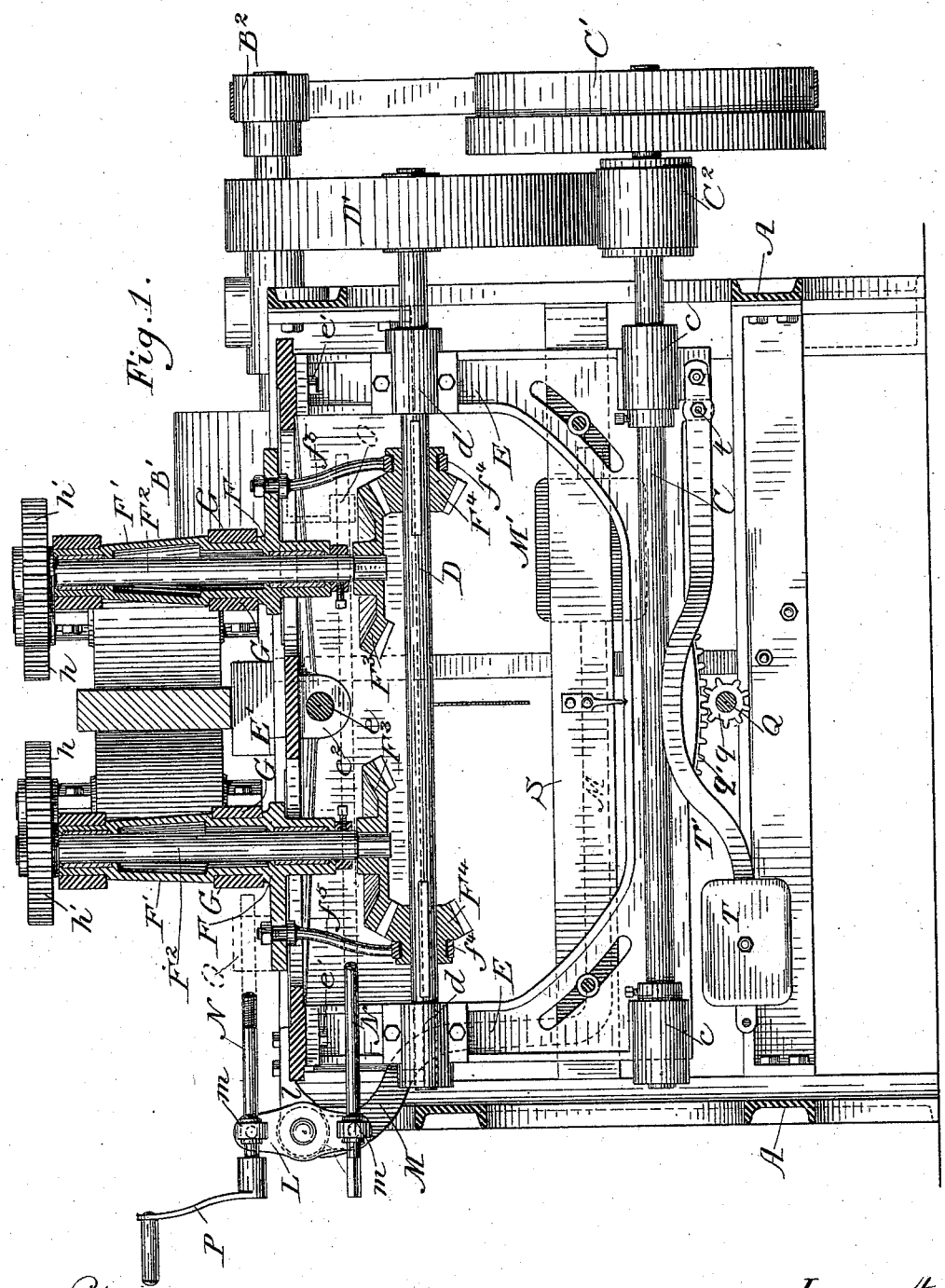

(No Model.)

2 Sheets—Sheet 1

R. B. JONES.
RESAWING MACHINE.

No. 266,997.

Patented Nov. 7, 1882.

Witnesses:
Jacob Lorum
Frank S. Blanchard

Inventor:
Richard B. Jones
By Prince & Fisher
His Attorneys.

(No Model.) 2 Sheets—Sheet 2.
R. B. JONES.
RESAWING MACHINE.
No. 266,997. Patented Nov. 7, 1882.
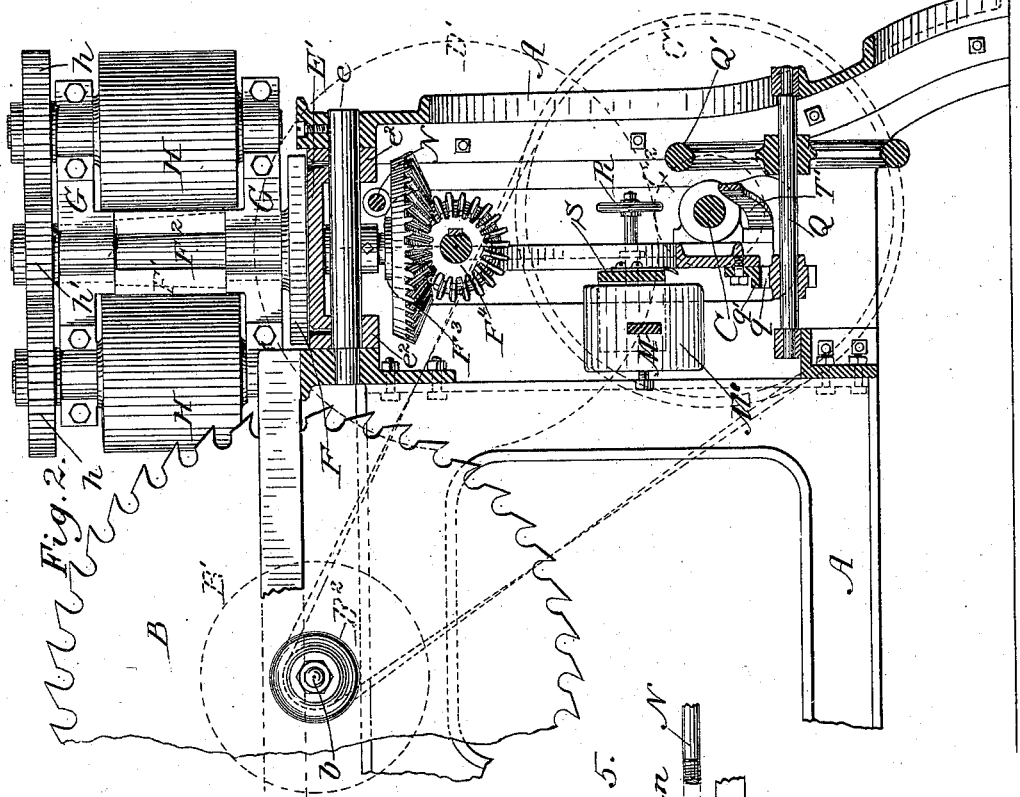
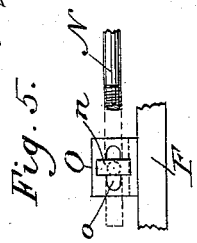
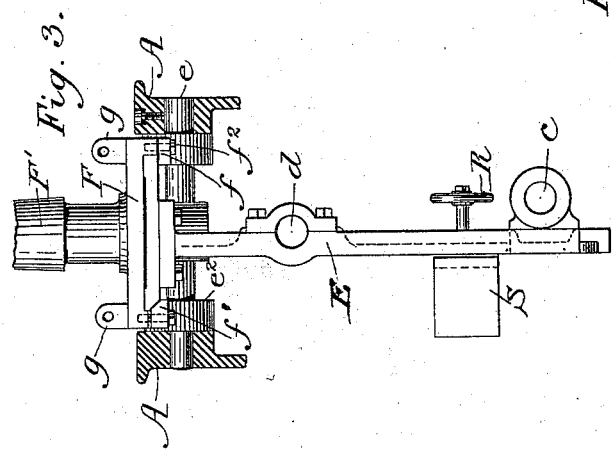
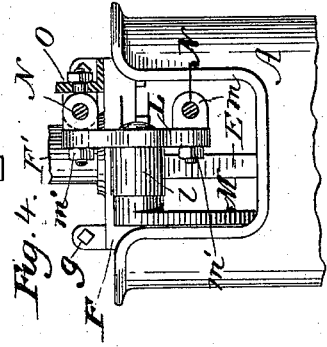
Witnesses:
Jacob Lorum.
Frank S. Blanchard.
Inventor:
Richard B. Jones
By Prince & Fisher
His Attorneys.

UNITED STATES PATENT OFFICE.

RICHARD B. JONES, OF CHICAGO, ILLINOIS, ASSIGNOR OF TWO-THIRDS TO RANSOM RICHARDS AND GEORGE F. WETHERELL, BOTH OF SAME PLACE.

RESAWING-MACHINE.

SPECIFICATION forming part of Letters Patent No. 266,997, dated November 7, 1882.

Application filed July 14, 1882. (No model.)

*To all whom it may concern:*

Be it known that I, RICHARD B. JONES, a citizen of the United States of America, residing at Chicago, in the county of Cook and State of Illinois, have invented certain new and useful Improvements in Resawing-Machines; and I do hereby declare the following to be a full, clear, and exact description, sufficient to enable others skilled in the art to which said invention appertains to practice the same, reference being had to the accompanying drawings, in which—

Figure 1 is a view in transverse section of the tilting frame, feed-table, rolls, and connected parts of a resawing or siding machine embodying my invention. Fig. 2 is a view in longitudinal section of the same; Fig. 3, a view in detail side elevation of the tilting frame and table, the carriage, and post for the feed-rolls, the main-frame supports being shown in section; Fig. 4, a detail view, showing in side elevation the counterpoise-arm, the rocker attached thereto, the adjusting-rods for the carriages of the rolls, and the connections thereof. Fig. 5 is a view in detail of the slotted lug on the carriage for the rolls and the connection of the adjusting-rod therewith.

My invention relates to resawing-machines, such as are employed to make siding, clap-boards, box material, or like thin stuff from lumber which has been previously sawed in the ordinary saw-mill; and said invention relates specifically to that class of resawing-machines wherein a tilting frame which carries the lumber-supporting table and feed-rolls is set at an angle to the main frame and to the plane of the saw, if desired, so that the lumber may be cut on a bevel, or with its edge of differing thickness.

The object of my invention is to increase the working capacity and durability of machines of this class, to which end it consists of certain improvements in the construction of a machine of the general plan of that set forth in Letters Patent No. 76,677, issued to L. B. Walker, April 14, 1868, which said improvements are hereinafter described, and more distinctly pointed out in claims.

In the drawings like letters of reference indicate like parts.

Upon the main frame A of the machine the saw B is sustained by its arbor $b$ in suitable bearings, as usual, said arbor carrying also the drive-pulley B' and the small pulley $B^2$, which latter communicates motion to the shaft C through the pulley C', secured thereto. The shaft C carries also the friction-pulley $C^2$, which bears against a like pulley, D', attached to shaft D. These two shafts C and D are mounted in suitable bearings, $c$ and $d$, upon the side of frame E, said rectangular frame being pivotally sustained in a manner to allow it to tilt or oscillate by means of the axle $e$, which is journaled at its ends in the cross-bars of the main frame A, and passes through the lugs or ears $e^2$, dependent from the under side of the face-plate or table E', which said table is bolted at $e'$ to the tilting frame E.

At either side of the line of the axle $e$ there is mounted upon the table E' a carriage, F, which is free to slide thereon, or may be secured at any point, as desired, the bars $f f'$ and the set-nuts $f^2$ being adjusted so that said bars shall travel with the carriage and serve as guides or ways with reference to table E', or shall act as clamps to hold the carriage and table tightly together, as the case may be. The bar $f'$ is made with a bevel-face to correspond to a like bevel upon the edge of table E', so that wear of parts or lost motion may be quickly remedied. From each carriage F projects the vertical hollow pillar or standard F', which extends below the table E', through a longitudinal slot cut therein, and upon its interior affords suitable bearings for the pinion-shaft $F^2$, passing therethrough. The shaft $F^2$ bears at its lower end the beveled-gear wheel $F^3$, which meshes with a like pinion, $F^4$, secured by feather and spline or equivalent joint to the revolving shaft D. A raised boss or flange upon the shank of pinion $F^4$ affords a seat for the encircling collar $f^4$ of an arm, $f^5$, which latter is attached, by set-nut or otherwise, to carriage F. By this construction and relation of the several parts the wheel $F^3$ is always maintained in gear with pinion $F^4$, whatever the position of carriage F with respect to table E', from which it follows that the motion of shaft D is always communicated to pinion-shaft $F^2$, and the rolls that feed the lumber forward to the saw kept thereby in rotation, as hereinafter described. It is to be noted, moreover, that as the rectangular frame E sustains the shafts C and D, the feed-table E', and carriages F, with their connected parts, these are kept in the same relation to each other, whatever the position of tilting frame E with respect to the main frame A of the machine.

In upper and lower recesses upon the exterior of the pillar F' are seated the plates G, which are clamped together by set-nuts, and are expanded near their ends to afford suitable journal-bearings for the axles of the upright feed-rolls H. The axles of said rolls carry at their upper ends the toothed pinions $h$, which are in gear with the pinion $h'$, secured to the upper end of the shaft $F^2$. By this means the rotation of shaft $F^2$ is communicated to the rolls H, so that said rolls act positively to advance the lumber against the revolving saw, any tendency of the rolls to move about pillar F' as an axis being checked, and as well the proper alignment of the rolls with respect to the saw secured by the guard-lugs $g$, which project from the carriage F, and have adjustable set-screws, with lock-nuts, passing therethrough, which said screws bear against the plates or arms G.

Upon the end of the tilting frame E is secured a perforated bracket, $l$, which journals a bolt that is fastened at its ends to a rocker-plate, L, and to the counterpoise-arm M, respectively. The rocker-plate L, which turns with the journal-bolt, has near its opposite ends the eyebolts $m$, the shanks of which are secured by set-nuts $m'$ to the rocker, while the smooth eyes of said bolts $m$ receive the connecting-rods N, the opposite threaded ends of which engage with like threaded eyes of bolts $n$, adjustable by set-nuts in the elongated slots $o$ of the lugs or blocks O, that project from the carriages F. A weight, M', adjustable on the counterpoise-arm M, operates through the rocker-arm L and connecting-rods N to keep the carriages F, and in consequence the feed-rolls, firmly against the piece of lumber, the bite of the rolls, or, in other words, their distance apart, being adjusted at will by the crank P, which turns the threaded connecting-rods N and advances or recedes the carriages F, as desired.

At the front of the machine, upon an axle, Q, journaled to the main frame and carrying the hand-wheel Q', there is secured a pinion, $q$, which meshes with a rack-bar, $q'$, that is bolted to the tilting frame E. If preferred, said rack and pinion, instead of being cut with straight teeth, may be made after the manner of the usual worm-gear, to allow for greater steadiness of movement, for it will be observed that said rack-and-pinion gear operates to tilt the table F and frame E about the axle $e$ as a center, and as said frame sustains the heavy working parts of the machine it is important that the same shall be moved with precision and without lost motion.

Through elongated slots in the tilting frame E extend the reduced threaded shanks of the small hand-wheels R, said shanks engaging with perforations in the cross-bar S, secured to the main frame A, and acting to clamp the frame E firmly against the face of the cross-bar S when the said hand-wheels R are properly rotated. The counter-weight T and arm T'—the latter pivoted at $t$ to the frame E, and attached at its end to the journal-box of the shaft C—operate to maintain friction-pulley $C^2$ in contact with pulley D', whatever the shift of frame E with respect to the main frame A.

As devised by me, the improvements in said resawing-machine secure the adjustment of the tilting frame with respect to the plane of the saw from a position which allows the workman to sight to a nicety the degree of inclination desired, and when thus positioned permits the frame to be clamped tightly and directly against the broad bearing-face of the cross-bar, so that it may be retained firmly against any possible play, strain, or tendency to displacement. Again, the long axle $e$ affords a wider firmer bearing for the heavy tilting table, and the machine parts in consequence can be made much heavier and stronger, so that while the strains are better distributed the work can be done with an ease, rapidity, and precision not heretofore attainable.

Having thus described the invention, what I claim as new, and desire to secure by Letters Patent, is—

1. In a resawing-machine, the combination, with the main frame of the machine, of a tilting frame carrying the feed-rolls, the axle of the tilting frame being sustained at both ends in said main frame, substantially as described.

2. In a resawing-machine, the combination, with the main frame and a tilting frame carrying the feed-rolls, and having a rack-bar, of a pinion to engage therewith, operated from the machine-front, substantially as described.

3. In a resawing-machine, the combination, with the main frame and the tilting frame, of a cross-bar extending entirely across the main frame, and adapted to strengthen the same, and afford a broad bearing-surface, against which the tilting frame may be directly clamped, substantially as described.

4. In a resawing-machine, the combination, with the main frame A, of the tilting frame E, carrying feed-rolls, and the sustaining-axle $e$ whereof is journaled at both ends in said main frame, the rack-bar $q'$, secured to said tilting frame, the pinion $q$, cross-bar S, and clamp-wheels R, substantially as described.

Witness my hand this 11th day of July, 1882.

RICHARD B. JONES.

Witnesses:
 JAMES H. PEIRCE,
 GEORGE P. FISHER, Jr.